३,६४२,९४१
THERMOPLASTIC MOLDABLE MASSES OF POLYAMIDE BLENDS
Johannes Schneider, 11 Ravensbergerweg, and Wolfgang Pungs, 1 Paul-Muller-strasse, both of 521 Troisdorf, Germany
No Drawing. Filed Mar. 21, 1969, Ser. No. 809,442
Claims priority, application Germany, Mar. 23, 1968,
P 17 69 040.3
Int. Cl. C08g *41/04*
U.S. Cl. 260—857                                           6 Claims

ABSTRACT OF THE DISCLOSURE

Improved polyamide molding materials comprising 1 to 99 parts by weight of partially crystallized or crystallizable polyamides which are the polymeric self condensation product of $\omega$-amino acids or $\omega$-lactams, or the condensation products of straight chain aliphatic diamines and aliphatic dicarboxylic acids, and 1 to 99 parts by weight of an amorphous polyamide which is the condensation product of an aromatic dicarboxylic acid, anhydride or lower alkyl ester thereof with 2,2,4 or 2,4,4-trimethyl-1,6-diamino-n-hexane or with straight chain aliphatic diamines having 6 to 12 carbon atoms between next adjacent amine groups.

---

It is known that polyamides, especially partially crystallized or partially crystallizing polyamides of the nylon type, may be appreciably altered in their physical and chemical properties by additions thereto of inorganic filling materials and other types of polymers. Thus, for instance, there are obtainable, by the addition of graphite, self-lubricating polyamides which may be, for instance, of significant utility as bearings and for gears. The addition of graphite, however, causes a lowering of the stretchability and tenacity of the polyamide. It is generally possible also to appreciably improve the hardness, rigidity, dimensional stability, and heat conductivity of such polymers by additions of inorganic filling materials thereto. However, the impact strength and especially the fatigue strength are lowered by such additions. With respect to the flow characteristics of the polymers the filler additions effect a disadvantage in that the melt viscosity thereof is increased. Furthermore, these additions are disadvantageous in that they produce an increase in the abrasiveness of the resulting filled materials occurs which leads to an appreciable increase in the mechanical wear of the mold, such as in injection molding, and of the injection nozzles during extrusion.

It is therefore an object of this invention to produce thermoplastic moldable masses of polyamides which avoid these prior art disadvantages.

Other and additional objects of this invention will become apparent from a consideration of this entire specification, including the claims hereof.

In accord with and fulfilling these objects, one aspect of this invention resides in a blend of polyamides comprising:

(A) 1 to 99 parts by weight, preferably 10 to 90 parts by weight, of a partially crystallized or crystallizable polyamide based on at least one of the following types of monomer:

(1) $\omega$-amino acids;
    (2) $\omega$-lactams; and
    (3) Aliphatic dicarboxylic acids and straight chain aliphatic diamines; and (B) 1 to 99 parts by weight, preferably 10 to 90 parts by weight, of an amorphous polyamide based on at least one aromatic dicarboxylic acid, acid anhydride or lower alkyl ester thereof and at least one of the following types of aliphatic diamine:

(1) 2,2,4-trimethyl-1,6-diamino hexane;
    (2) 2,4,4-trimethyl-1,6-diamino hexane; and
    (3) Straight chain diamine having 6 to 12 carbon atoms between next adjacent amino groups.

The partially crystallized, or partially crystallizable, polyamides of group A above may be grouped together under the collective term "nylon." Examples of such polyamides are nylon 6, nylon 6,6, nylon 6,10, nylon 11, nylon 12, mixed condensates of hexamethylene diamine—adipic acid and $\epsilon$-caprolactam, and/or mixed condensates of hexamethylene diamine-adipic acid, $\epsilon$-caprolactam and p,p'-diaminodicyclohexylmethane. These polyamides are generally considered to be per se known to the art.

Amorphous polyamides of group B above which are within the scope of the invention are exemplified by polycondensates of the various isomeric phthalic acid moieties, preferably terephthalic acid and 2,2,4- and/or 2,4,4-trimethylene-1,6-diamino hexane or hexamethylene diamine. The production of such polymers has been described in the U.S. Pat. 3,150,117. In the synthesis of similar condensates usable in accordance with the invention, there may be used also the dimethyl ester of terephthalic acid as the starting material instead of the terephthalic acid. Such syntheses are the subject of Austrian Pat. 253,786. These amorphous polyamides are generally considered to be per se known to the art.

It is especially preferred to use as amorphous polyamides for the moldable masses of polyamides in accordance with the invention, the polyamides based on aromatic dicarboxylic acids and unbranched aliphatic amines with 6 to 12 carbon atoms, most particularly the polyconcentrates of terephthalic acid and/or isophthalic acid and hexamethylene diamine. In accordance with Austrian Pat. 251,882, this condensation synthesis of such amorphous polycondensates proceeds suitably from mixtures of phthaloyl moieties, preferably 60 to 80 mol percent diphenylisophthalate and 40 to 20 mol percent of diphenylterephthalate, which are polycondensated with corresponding molar amounts of hexamethylene diamine or nonamethylene diamine.

The above-referred-to amorphous polyamines which possess viscosity numbers in the range of 90 to 180, preferably of 130 to 160, have been found to be particularly useful as starting materials for the moldable masses in accordance with the invention. It is to be understood, in this connection, that the term "viscosity number" means the value defined in the German standards DIN 53727. In the present case, a 0.5 weight/percent-solution of polymer in m-cresol at 25° C. was used to determine viscosity numbers The moldable masses in accordance with the invention are particularly advantageously prepared by admixture of the components A and B in molten form. Such melt-mixing results in fast production of homogeneous, uniform masses. It is also practical to form the desired admixture in a rapidly rotating whirling mixer. In this latter case a powder or granulate form polymer which is as fine as possible is used. For melt admixture, it is recommended to pre-mix the components at room temperature in a rapidly rotating mixer and to plastify the resulting mixture in a conventional compounding mill. For this purpose, mill temperatures of about 200 to 280° C. should be used.

Basically, the moldable masses in accordance with the invention may also contain all those additives which are conventionally used with polyamides, such as inorganic fillers, dyes, U.V. stabilizers, antioxidants, flame-resisting agents, etc.

The moldable masses in accordance with the invention do not possess the above-referred-to disadvantages of the individual polyamide components of these moldable masses, such as an unfavorable melt viscosity, high abrasion effect when injection molding and/or while extruding. On the contrary, they show an improved rigidity and dimensional stability of the molded shape product. The molded bodies produced therefrom are harder, more resistant to breakage, more heat resistant, and are characterized by an increased impact strength. The latter shows an optimum when the proportion of the amorphous polyamide in the moldable mass is about 40 to 60 wt. percent. Furthermore, the thus-produced shaped bodies tend to have little heat distortion and tendency to collapse. The increased shape rigidity and the higher heat shape stability permit, as for instance when injection molding, higher deformation temperatures. This makes possible more rapid production and lower cooling requirement, and thus results in overall energy savings.

An especially surprising effect for the polyamide mixture in accordance with the invention has been noted. When producing by injection molding from such moldable masses shaped bodies of 4 mm. thickness, such as plates, at 100° C., such shaped articles remain transparent after cooling if the moldable mass contains nylon 6, nylon 6,6 or nylon 6,10 in amounts up to about 60 wt. percent and preferably up to about 40 wt. percent.

The following examples are illustrative of this invention without being limiting thereon:

EXAMPLE 1

10 parts per weight of nylon 6 with a viscosity number of 157 were pre-mixed in a whirl mixer for 10 minutes at room temperature with 90 parts by weight of mixed polycondensate of terephthalic acid and 2,2,4- and 2,4,4-trimethyl-1,6-diamino hexane whereby these amines were present in a weight ratio of 1:1. Thereafter, this mixture was compounded in a double worm gear extruder (brand Alpine, type 60 DL) in the melt. The temperatures in the different zones were as follows: Zone 1, +250° C.; Zone 2, +265° C.; Zone 3, +270° C.; Zone 4, +250° C.; temperature of the ejection nozzle +230° C. The number of rotations of the worm gear was 13 r.p.m. The filaments exiting from the extruder head were cooled in an air current and were cut up in a chopping granulator to form a cylindrical granulate.

The thus obtained granulate was shaped in a plunger type injection molding machine to form standard testing rods. After storing for 16 hours, the following mechanical values were found by standard testing.

Limit of bending stress according to DIN 53,452: 1,145 kp./cm.$^2$.
Impact strength according to DIN 53,452: 65 kp./cm.$^2$
Martens dimensional stability (air, 5 kp.): 85° C.
Shape shrinkage: 0.7%
Post-shrinkage after 2 hours:
  100° C.: 0.07%
  120° C.: 0.1%

EXAMPLES 2 TO 25

The same procedure as in Example 1 was used, except that instead of nylon 6 there were employed partly other nylon types, other mixing ratios and other temperatures and numbers of rotation of the extruding worm gear. The individual experimental conditions are set forth in Table 1. There were used as amorphous polyamide again the polycondensate of terephthalic acid and mixed 2,2,4- and 2,4,4-trimethyl-1,6-diamino hexane. The results of the mechanical testing are set forth in Table 2.

EXAMPLES 26 TO 30

The procedure was analogous to that set forth in the previous examples. There were used, however, as the partially crystallized or crystallizable polyamide (component A) a nylon 6,6 and as the amorphous polyamide (component B) a mixed condensate of tere- and isophthalic acid and hexamethylene diamine. The weight ratio of the terephthalic acid to isophthalic acid in the latter polymer was 3:7. The experimental conditions are set forth in Table 3, and the results of the mechanical testing are specified in Table 4.

TABLE 1

Production of shaped bodies of polyamides from nylon of different types and polycondensates of terephthalic acid and 2,2,4- and 2,4,4-trimethylhexamethylene

| Example | Nylon type | Viscosity number | Content of nylon weight, percent | Cylinder temperatures in ° C. | | | | Temperature in ° C. of ejection nozzle | Number of rotations of worm gear, r.p.m. |
|---|---|---|---|---|---|---|---|---|---|
| | | | | Zone 1 | Zone 2 | Zone 3 | Zone 4 | | |
| 2 | Nylon 6 | 157 | 100 | | | | | | |
| 3 | | | 90 | 240 | 245 | 245 | 237 | 220 | 13 |
| 4 | | | 60 | 240 | 250 | 255 | 237 | 220 | 13 |
| 5 | | | 40 | 245 | 265 | 265 | 245 | 230 | 13 |
| 6 | Nylon 6,6 | 164 | 100 | | | | | | |
| 7 | | | 90 | 255 | 260 | 265 | 255 | 240 | 13 |
| 8 | | | 60 | 255 | 260 | 265 | 250 | 240 | 13 |
| 9 | | | 40 | 240 | 250 | 255 | 240 | 230 | 13 |
| 10 | | | 10 | 250 | 265 | 270 | 255 | 230 | 13 |
| 11 | Nylon 6,10 | 178 | 100 | | | | | | |
| 12 | | | 90 | 220 | 245 | 260 | 250 | 225 | |
| 13 | | | 60 | 220 | 245 | 260 | 250 | 225 | |
| 14 | | | 40 | 225 | 250 | 265 | 245 | 225 | |
| 15 | | | 10 | 250 | 255 | 270 | 255 | 230 | |
| 16 | Nylon 11 | 160 | 100 | | | | | | |
| 17 | | | 90 | 230 | 245 | 240 | 240 | 230 | 16 |
| 18 | | | 60 | 230 | 245 | 250 | 250 | 240 | 14 |
| 19 | | | 40 | 230 | 250 | 255 | 255 | 245 | 13 |
| 20 | | | 10 | 240 | 260 | 275 | 260 | 245 | 14 |
| 21 | Nylon 12 | 160 | 100 | | | | | | |
| 22 | | | 90 | 240 | 250 | 250 | 245 | 235 | 16 |
| 23 | | | 60 | 230 | 250 | 260 | 260 | 235 | 15 |
| 24 | | | 40 | 230 | 250 | 260 | 260 | 245 | 15 |
| 25 | | | 10 | 230 | 260 | 275 | 260 | 245 | 14 |

TABLE 2

Results of mechanical testing of Examples 2 to 25

| Example | Impact resistance (DIN 53453) kp. cm./cm.² | Limits of bending stress (DIN 53452) kp./cm.² | Stability of shape (Martens) (air; 5 kp.) ° C. | Shrinkage of shape, percent | Post-shrinkage after 2 hrs. | |
|---|---|---|---|---|---|---|
| | | | | | 100° C., percent | 120° C., percent |
| 2 | 8.7 | 780 | 49 | 1.7 | 0.50 | |
| 3 | 17.5 | 876 | 49 | 1.4 | 0.13 | 0.33 |
| 4 | 12.5 | 900 | 63 | 0.9 | 0.20 | 0.36 |
| 5 | 9.5 | 990 | 68 | 0.8 | 0.20 | 0.34 |
| 6 | 4.6 | 850 | 55 | 2.0 | 0.50 | |
| 7 | 6.0 | 1,045 | 57 | 1.7 | 0.10 | 0.24 |
| 8 | 5.5 | 1,035 | 63 | 1.2 | 0.12 | 0.25 |
| 9 | 7.0 | 1,075 | 69 | 0.9 | 0.12 | 0.24 |
| 10 | 5.5 | 1,135 | 89 | 0.7 | 0.08 | 0.10 |
| 11 | 8.0 | 640 | 41 | 1.6 | 0.50 | |
| 12 | 11.5 | 650 | 44 | 1.6 | 0.15 | 0.40 |
| 13 | 8.5 | 795 | 51 | 1.1 | 0.15 | 0.30 |
| 14 | 7.2 | 915 | 72 | 0.7 | 0.10 | 0.30 |
| 15 | 5.5 | 1,070 | 83 | 0.5 | 0.07 | 0.10 |
| 16 | 8.5 | 465 | 37 | 1.6 | 0.40 | 0.30 |
| 17 | 10.5 | 505 | 40 | 1.6 | 0.23 | 0.30 |
| 18 | 14.5 | 670 | 45 | 0.9 | 0.15 | 0.30 |
| 19 | 10.0 | 785 | 55 | 0.8 | 0.15 | 0.20 |
| 20 | 6.0 | 1,030 | 86 | 0.6 | 0.08 | 0.11 |
| 21 | 7.3 | 510 | 49 | 1.5 | 0.20 | 0.30 |
| 22 | 9.0 | 540 | 49 | 1.5 | 0.20 | 0.30 |
| 23 | 11.0 | 650 | 58 | 0.9 | 0.15 | 0.15 |
| 24 | 8.5 | 800 | 64 | 0.8 | 0.10 | 0.20 |
| 25 | 6.5 | 900 | 87 | 0.7 | 0.08 | 0.08 |

TABLE 3

Production of molded masses of polyamide from Nylon 6,6 and from mixed condensates from ter- and isophthalic acid and hexamethylene diamine

| Example | Content of Nylon 6,6 in wt. percent | Viscosity number | Cylinder temperatures in ° C. | | | | Temperature, ° C., ejection nozzle | Number of rotations of the worm gear, r.p.m. |
|---|---|---|---|---|---|---|---|---|
| | | | Zone 1 | Zone 2 | Zone 3 | Zone 4 | | |
| 26 | 100 | 164 | | | | | | |
| 27 | 90 | 164 | 230 | 245 | 250 | 250 | 230 | 15 |
| 28 | 60 | 164 | 230 | 245 | 250 | 250 | 230 | 13 |
| 29 | 40 | 164 | 240 | 250 | 260 | 260 | 230 | 14 |
| 30 | 10 | 164 | 240 | 255 | 265 | 265 | 240 | 14 |

TABLE 4

Results of mechanical testing of Examples 26 to 30

| Example | Impact resistance (DIN 53453) kp. cm./cm.² | Limits of bending stress (DIN 53452) kp./cm.² | Stability of shape (Martens) (air; 5 kp.) ° C. | Shrinkage of shape, percent | Post-shrinkage after 2 hrs. | |
|---|---|---|---|---|---|---|
| | | | | | 100° C., percent | 120° C., percent |
| 26 | 4.6 | 850 | 55 | | 0.50 | |
| 27 | 5.6 | 1,000 | 55 | | 0.20 | 0.26 |
| 28 | 7.0 | 1,050 | 60 | | 0.18 | 0.20 |
| 29 | 8.0 | 1,050 | 65 | | 0.12 | 0.14 |
| 30 | 9.0 | 1,100 | 75 | | 0.06 | 0.10 |

What is claimed is:

1. A molding composition comprising 1 to 99 parts per weight of a first polyamide which is at least one member selected from the group consisting of nylon 6, nylon 6,6, nylon 6,10, nylon 11, and nylon 12, and 1 to 99 parts by weight of a second polyamide which is at least one reaction product selected from the group consisting of polyamides of terephthalic acid and one aliphatic diamine consisting of 2,2,4-(trimethyl-1,6-diamino hexane) and 2,4,4-(trimethyl-1,6-diamino hexane) and mixtures thereof, and amorphous polyamides of hexamethylene diamine and a mixture of 60 to 80 mole percent isophthalic acid units and 20 to 40 mole percent terephthalic acid units.

2. A molding composition as claimed in claim 1, containing 10 to 90 parts by weight of each of the polyamide components.

3. A molding composition as claimed in claim 1, containing, in addition to said polyamide, at least one member selected from the group consisting of fillers, dyes, ultraviolet stabilizers, antioxidants, and flame-resisting agents.

4. A molding composition as claimed in claim 1, wherein said second polyamide has a viscosity number of about 90 to 180.

5. A molding composition as claimed in claim 1, wherein said second polyamide has a viscosity number of about 130 to 160.

6. A shaped article of the composition claimed in claim 1.

References Cited

UNITED STATES PATENTS

| 3,195,603 | 7/1965 | Ahles | 260—857 |
| 3,216,965 | 11/1965 | Cipriani | 260—857 |
| 3,296,213 | 1/1967 | Preston | 260—857 |
| 3,303,169 | 2/1967 | Pitzl | 260—857 |
| 3,416,302 | 12/1968 | Knospe | 260—857 |
| 3,457,325 | 7/1969 | Anton | 260—857 |
| 3,468,850 | 9/1969 | Foster | 260—857 |

FOREIGN PATENTS

| 918,637 | 2/1963 | Great Britain | 260—857 |

PAUL LIEBERMAN, Primary Examiner

U.S. Cl. X.R.

260—78 R